United States Patent [19]

Connell

[11] Patent Number: 5,596,714
[45] Date of Patent: Jan. 21, 1997

[54] METHOD FOR SIMULTANEOUSLY TESTING MULTIPLE GRAPHIC USER INTERFACE PROGRAMS

[75] Inventor: Mark A. Connell, Los Gatos, Calif.

[73] Assignee: Pure Atria Corporation, Sunnyvale, Calif.

[21] Appl. No.: 396,116

[22] Filed: Feb. 28, 1995

Related U.S. Application Data

[63] Continuation-in-part of Ser. No. 273,302, Jul. 11, 1994, abandoned.

[51] Int. Cl.$^6$ .................................................. G06F 11/00
[52] U.S. Cl. ............................. 395/183.14; 395/183.22
[58] Field of Search .......................... 395/183.14, 183.13, 395/184.01, 183.22

[56] References Cited

U.S. PATENT DOCUMENTS

| | | | |
|---|---|---|---|
| 5,233,611 | 8/1993 | Triantafyllos et al. | 395/183.14 |
| 5,333,302 | 7/1994 | Hensley et al. | 395/183.14 |
| 5,335,342 | 8/1994 | Pope et al. | 395/183.14 |
| 5,375,125 | 12/1994 | Oshima et al. | 395/183.14 |
| 5,375,228 | 12/1994 | Leary et al. | 395/575 |
| 5,394,347 | 2/1995 | Kita et al. | 364/578 |
| 5,414,836 | 5/1995 | Baer et al. | 395/183.14 |

OTHER PUBLICATIONS

Mosely et al., "Client–Server User Ineterface Testing", IEEE Software, Jan. 1995, vol. 12, Iss. 1, pp. 124–127.

Yip et al, "Applyiong Formnal Specification and Functional Testing to Graphical User Interfaces," Compeuro '91, IEEE pp. 557–561.

Yip et al., "Graphical User Interfaces Validation: A Problem Analysis and a Strategy to Solution", IEEE, 1991, pp. 91–100.

Primary Examiner—Robert W. Beausoliel, Jr.
Assistant Examiner—Joseph E. Palys
Attorney, Agent, or Firm—Eric H. Willgohs; William C. Fleming; Robin D. Goldstein

[57] ABSTRACT

A method for testing programs running under a Graphic User Interface (GUI) is provided. The method is especially adapted to work with GUI's operating in a network based display architecture, such as the X11 server release of X Window. The invention provides a mechanism to test several GUI based programs simultaneously while also allowing normal interactive workstation activities to continue. The invention does not require the use of a special X11 server, or the relinking of tested code. The invention may operate using either of two approaches, depending on the capabilities of the window system being used. The first approach uses a mechanism that duplicates the contents of a window into off screen storage. Since this memory copy of a window is guaranteed to be identical to the on screen window, it can be read in place of the screen contents to test for proper drawing. In the case of systems which do not support a memory resident copy of screen windows, the tester automatically places the correct window on top of all others. Since there may still be conflicts if there are multiply copies of the tester running, as can happen when more than one tester may be trying to place the windows on top of the others at the same time, a locking mechanism is provided for the screen. This mechanism prevents a window from one test from obscuring a window being captured for another test.

5 Claims, 6 Drawing Sheets

METHOD FOR SIMULTANEOUSLY TESTING MULTIPLE GRAPHIC USER INTERFACE PROGRAMS

CROSS-REFERENCE TO RELATED APPLICATIONS

This application is a Continuation-In-Part of, and claims priority from, U.S. patent application Ser. No. 08/273,302 filed Jul. 11, 1994, now abandoned, entitled METHOD FOR TESTING A GRAPHIC USER INTERFACE, and is commonly assigned with the present invention.

TECHNICAL FIELD

This invention relates, in general, to the field of performing Quality Assurance (QA) testing on computer programs and, more particularly, to an improved method for testing programs employing a graphic user interface operating under a multi programmed operating system where the output of the program under test is not character based, but image based and, therefore, requires that the display be in a known and stable state before a test evaluation can take place. The invention provides a mechanism to test several GUI based programs simultaneously while also allowing other programs to be run and normal interactive workstation activities to continue.

BACKGROUND OF THE INVENTION

In the field of computer technology, as microprocessors employing advanced processing architectures capable of greater computing power have been developed, both operating system software and application software have also been developed which take advantage of and, in many cases require, such increased power. Much of this advanced software development has been for the purpose of increasing the 'user friendliness' of computers through the deployment of software having a more intuitive Graphic User Interface (GUI). The use of GUI's has been steadily increasing on almost every processing platform including Windows (in each of its various flavors) for the IBM-PC and System 7 for the Apple Macintosh computer. In addition, there has also been developed a class of GUI's which are not computer specific, but are rather network based display architectures. One such example of a current popular network based display architecture is the X-Window system developed at MIT and currently in release 11, (heretofore known as X11). X11 is particularly well regarded for its network transparency; network independence; device independence; and flexible user interface. In addition X11 is non-proprietary, and while it is most frequently run on UNIX computers, is also widely available to run on a wide range of other computer systems.

While the development of such powerful GUI software has in many ways eased the operation of computers and made them more accessible to more people, such increasingly complex software has also increased the likelihood of programming errors, or 'bugs' being introduced into the software, resulting in unexpected operation or errors. Whereas in the past software was often written by a sole individual, today's complex software suites are often written using a team model where many different software developers work together on a project with the result that often no one person has a mastery of the entire package of code. Therefore, such increased complexity has made it even more important to thoroughly test software before it is released. However, as programs have become more graphical, and as multitasking GUI's have become the standard way in which users interact with computers, additional difficulties not encountered in character based systems have become recognized.

In particular, an application running on a modern, multitasking computer system may receive input from a keyboard or another input device, such as a trackball or a mouse. The application may also be communicating with separate programs that supply additional input to the GUI application. During certain periods of operation, including those spent communicating with separate programs, a GUI application may wish to accept certain system generated input, while discarding any input generated by the user. Since, unlike operation of a character based systems, in a GUI application the output is not a string of characters, but a series of images, which may include representations of characters but which need to be managed as images and not text, the accurate and efficient testing of GUI applications can be understood to be quite difficult.

In general, the testing of GUI applications requires that the Application Under Test (AUT) be sent a series of prerecorded keyboard and mouse events, generally stored as a 'script'. This test script is designed such that for every input event it is known what the correct output event should be. However, in order to ensure correct operation of the tester, the tester, X11 server and AUT must be synchronized so that events are not sent to the AUT until it is in a state where the events will be correctly processed.

An improved GUI tester which accomplished the aforenoted synchronization is disclosed in copending application Ser. No. 08/273,302, "METHOD FOR TESTING A GRAPHIC USER INTERFACE" (having the same inventor and being commonly assigned as the instant invention). In the improved system, the teachings of which are nonessential and incorporated herein by reference, the GUI tester is interposed between the X11 server and the AUT so that all communications between the user (and the X11 server) and the AUT must pass through the GUI tester. This permits the GUI tester to exercise complete control over the processing and transfer of events into and out of both the X11 server and terminal display and the AUT. By exercising such control, the improved GUI tester of the copending invention can determine with certainty the state of the display at any particular point in time during a test and, thereby, optimize the comparison of previously saved screen images to a screen image generated under test by ensuring that the display is in a known state prior to performing such a comparison.

However, an additional limitation recognized in the prior art is that although GUI testers are most frequently run in a multi programmed operating system environment where multiple GUI applications may be run at the same time, conventional GUI testers mandate that only one GUI program, and no other program of any type, be run during test, frequently requiring the dedication of a system just for test purposes and often wasting time, money and system resources.

In particular, while multi programmed operating systems are designed to allow multiple applications to run at the same time, when testing GUI program, the current state of the art requires that the GUI tester and the Application Under Test (AUT) take over the keyboard and mouse. This means that when running a GUI test the user can not interact with other applications since, if an attempt is made to use the keyboard or mouse during the test, the test will fail. For this reason, most prior art GUI testers, because they take over the keyboard and mouse, do not allow multiple GUI applications to be tested at the same time.

Recently, there has been developed an architecture which permits multiple applications to be tested at the same time. However, in order to accomplish this a special X11 server is required, which means that the computer code which is shipped after successful testing is not exactly the same as the computer code which has been tested. In addition, these multi-application testers require relinking the code of the tested program with the standard Xt library, which also increases the difference between the code tested and the code shipped.

Accordingly, it has been determined that the need exists for an improved method for testing a graphic user interface in which multiple GUI applications may be tested at the same time, in which no special X11 server is needed, in which no relinking is required and which allows other applications (including interactive applications) to run normally.

SUMMARY OF THE INVENTION

Generally speaking, in accordance with the invention, a method is provided to permit the testing of one or more programs running under a Graphic User Interface (GUI) operating in a network based display architecture while, at the same time, also allowing normal interactive workstation activities to continue.

Under various aspects of the invention the following advantages may be realized:

1. One or more GUI tests may be run at the same time on the same workstation without the generation of false test 'error' messages;

2. During GUI testing, other interactive non-test programs, such as E-mail, may also be run without affecting the results of the tests underway, with the result that the purchase of a dedicated test workstation is not required;

3. The exact binary code which has been tested is the same code which may be shipped to customers, and no relinking with the standard Xt library is needed;

4. No special X11 server is required for testing; and

5. The ability to stimulate a GUI application program by replaying previously recorded mouse and keyboard events is provided with the additional element that while replaying previously recorded test events it is possible to run a programmatic debugger on the application being tested AT THE SAME TIME. This allows the user to debug GUI programs at the user interface level instead of at the programmatic level, and further permits a GUI programmer to debug an application with an entirely new debugging abstraction, "User Interface" level debugging.

In order to realize these advantages the invention provides a mechanism to capture a window that is obscured by another window, using one of two approaches. The first approach uses a mechanism that duplicates the contents of a window into off screen storage. Since this memory copy of a window is guaranteed to be identical to the on screen window, it can be read in place of the screen contents to test for proper drawing. The advantage of doing this is that the memory resident copy of the window is kept up to date even if the on screen window is obscured by other windows. Then, by reading the copy, the GUI tester gets the result that would be obtained if the test window was the top window on the screen.

In the case of systems which do not support a memory resident copy of screen windows, the tester automatically places the correct window on top of all others. Since there may still be conflicts if there are multiple copies of the tester running, as can happen when more than one tester may be trying to place the windows on top of the others at the same time, a locking mechanism is provided for the screen. During the screen capture, the GUI tester will take control of the screen, raise the window to be captured, capture the window, and then release the screen control lock. This prevents a window from one test from obscuring a window being captured for another test. This mechanism is also used in connection with systems which support off screen memory so that when the GUI Tester knows that the off screen contents have been discarded the second mechanism described above may be activated.

Therefore, by using the architecture of the invention it is possible to create a test system where the keyboard and mouse may be used by other applications in the normal way while a GUI test is running; where multiple GUI tests may be run at the same time; and where, by replaying previously recorded mouse and keyboard events, it is possible to run a programmatic debugger on the application at the same time as it is being tested allowing a user to debug GUI programs at the user interface level instead of at the programmatic level.

Accordingly it is an object of the invention to provide an improved method for testing graphic user interface software.

It is another object of the invention to provide an improved method for testing graphic user interface software which is specially adapted to run on a network based display architecture.

It is a further object of the invention to provide an improved method for testing graphic user interface software in which communications between the display server and the application under test are routed through the tester.

It is an additional object of the invention to provide an improved method for testing graphic user interface software whereby a synchronization step is forced through the client/server loop in order to establish the display in a known and stable state.

It is yet another object of the invention to provide an improved method for testing graphic user interface software whereby user generated input events are ignored during the testing process.

It is yet a further object of the invention to provide an improved graphic user interface software which reduces incidents of erroneous test failures.

It is yet an additional object of the invention to provide an improved method for simultaneously testing multiple graphic user interface programs.

It is still another object of the invention to provide an improved method for simultaneously testing multiple graphic user interface programs where a program may be under test while another program is operating in a normal manner.

It is still a further object of the invention to provide an improved method for simultaneously testing multiple graphic user interface programs which is able to capture a window that is obscured by another window.

It is still an additional object of the invention to provide an improved method for simultaneously testing multiple graphic user interface programs which reduces the need to dedicate a workstation to only testing purposes.

It is also another object of the invention to provide an improved method for simultaneously testing multiple graphic user interface programs where other debug programs may be run at the same time to profile and debug the application under test.

Still other objects and advantages of the invention will, in part, be obvious and will, in part, be apparent from the specification.

The invention accordingly comprises the features of construction, combinations of elements and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following descriptions taken in connection with the accompanying drawings, in which.

NOTATION AND NOMENCLATURE

The detailed description that follows is presented largely in terms of algorithms and symbolic representations of operations on data bits and data structures within a computer memory. These algorithmic descriptions and representations are the means used by those skilled in the data processing arts to most effectively convey in substance their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bit patterns, values, elements, symbols, characters, data packages, or the like. It should be borne in mind, however, that all of these and similar terms are to be associated with the appropriate physical quantities and are merely convenient labels applied to these quantities.

Further, the manipulations performed are often referred to in terms, such as adding or comparing, that are commonly associated with mental operations performed by a human operator. No such capability of a human operator is necessary, or desirable in most cases, in any of the operations described herein that form part of the present invention; the operations are machine operations. Useful machines for performing the operations of the present invention include general purpose digital computers or other similar devices. In all cases there should be borne in mind the distinction between the method of operations in operating a computer and the method of computation itself. The present invention relates to method steps for operating a computer in processing electrical or other (e.g. mechanical, chemical) physical signals to generate other desired physical signals.

The present invention also relates to an apparatus for performing these operations. This apparatus may be specially constructed for the required purposes, or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct a more specialized apparatus to perform the required method steps. The required structure for a variety of these machines will appear from the description given below.

DETAILED DESCRIPTION OF THE PREFERRED EMBODIMENTS

Figure 1:
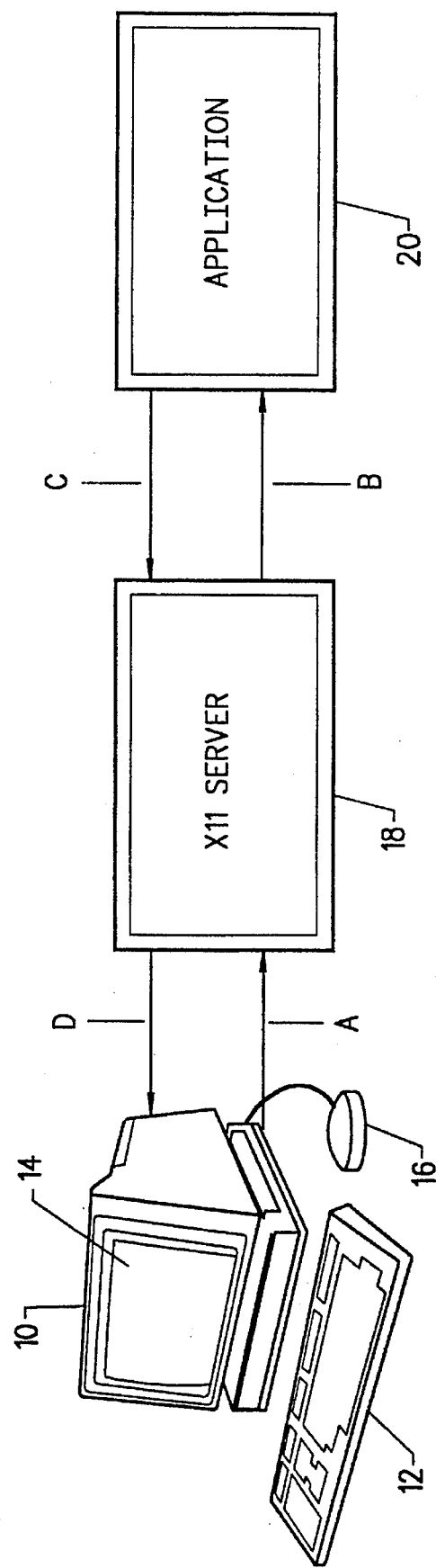
FIG. 1 is an illustration of a standard computer configuration operating in accordance with a network based display architecture.

Referring first to FIG. 1, a typical configuration for an application running in the UNIX Environment is shown. Such a system includes a terminal 10 which comprises a keyboard 12, a display screen 14 and an additional input device, such as a mouse 16.

In this configuration a user enters keystrokes on keyboard 12 and enters mouse events by moving mouse 16 or clicking on its buttons. These keyboard and mouse events are transferred by the terminal hardware 10 to an X11 Server 18 via path "A". The X11 Server receives and examines each keyboard and mouse event and sends those events to the appropriate application. (Although only one application is shown in the figures, under a multitasking GUI operating system, such as X11, multiple applications may be run simultaneously with their results displayed in different 'windows' drawn on display screen 14.) In this way, if two applications are running on a terminal at the same time, some keystrokes may go to one application while other keystrokes may go to another. The X11 Server sends the appropriate mouse and keyboard events to the proper application. In FIG. 1, communication from X11 Server 18 to an Application 20 is along path "B".

After receiving these input events, Application 20 then processes the input mouse and keyboard events and then writes the results of this processing back to the screen. The application does this by communicating with the X-11 Server along path "C". The X11 Server, in turn, processes the instructions from the application and sends the necessary instructions to the terminal hardware to update the appropriate locations on the display screen.

As noted, testing a program run in the above configuration is more difficult than testing a program run in a character mode across a serial line, particularly due to the graphic nature of the user interface. Therefore, referring next to FIG. 2 a traditional GUI Tester architecture is shown. As can be seen, in the prior art the GUI Tester can not communicate directly with the AUT, but must rely on sending and receiving events through the X11 server.

In operation the GUI Tester operates according to the following procedure. Generally testing takes place in three phases:

Phase 1—Run Phase

Figure 2:
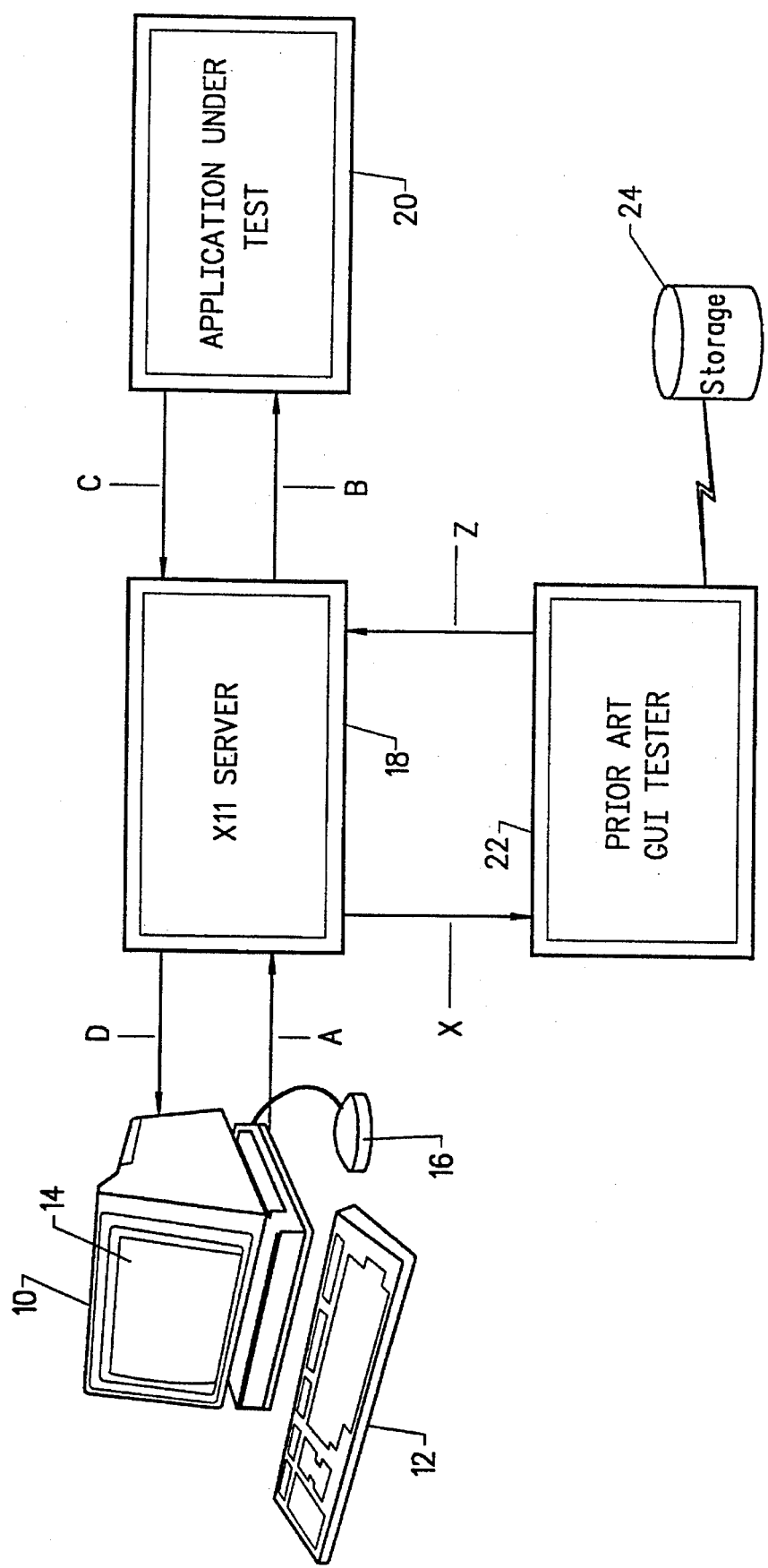
FIG. 2 is an illustration of a computer configuration for testing an application under test in accordance with the prior art.

In this phase the AUT 20 is run in the configuration shown in FIG. 2. In this case the X11 server 18 is "tricked" into sending the keyboard and mouse events to both a GUI Tester 22 and to the AUT 20. The GUI Tester 22 records all of the incoming events to a test script which is stored on a storage device 24 so that these events can be edited, if desired, and then replayed later.

The AUT 20 processes the events and then sends commands back to the X11 server 18 to provide the appropriate feedback to the user. The X11 server 18 process these commands and then updates the terminal screen 14.

After the RUN PHASE is finished, the user may go back to the test script that contains the recorded keyboard and mouse events and edit in additional events such as instruction loops and screen capture commands at points within the script where the testing of screen images is desired.

Phase 2—Capture Phase

In this phase the test script recorded above, as modified, is run from the storage device 24 and the prior art GUI Tester 22 communicates these instructions to the X11 server 18, which interprets the instructions as though they had been sent from terminal 10. In this way the prior art GUI Tester 22 communicates through the X11 server 18 to the AUT 20. Since the AUT 20 doesn't know where the events it is receiving have been generated, it processes them as in the RUN PHASE and sends its output back to the X11 server, where the results are displayed on terminal 10 so that an operator may evaluate the output of the AUT to determine that, in fact, the AUT has run properly. However, unlike during the RUN PHASE, during the CAPTURE PHASE the images which are returned to the X11 server for display are also sent to the GUI Tester 22, where the images are saved to the storage device 24 for later comparison. In the literature the CAPTURE PHASE is also often referred to as the INITIALIZATION PHASE.

Phase 3—Comparison Phase

After the CAPTURE PHASE (or INITIALIZATION PHASE) is completed, the final phase, the COMPARISON PHASE, is entered and the test actually executed. In the COMPARISON PHASE the test script is played once again and the screen capture process also repeated, as in the CAPTURE PHASE. However, in the COMPARISON PHASE the screen images captured are compared to the screens saved in phase 2, the CAPTURE PHASE; a series of known accurate screen images. If, after comparison, the screen images match, then the test passes and it is determined that the AUT has run correctly. However, if the screen images don't match, then it is known that something has modified the operation of the AUT and the test fails.

As illustrated in FIG. 2, and described above, in operation the GUI tester 22 reads script commands stored in a script file on storage disk 24. These commands have been stored and edited as necessary during the RUN PHASE and are sent to the X11 server via the path marked "Z". The X11 server treats these script events as a true keyboard or mouse event and passes these events on to the AUT via path "B". The AUT then processes the script events and then sends commands back to the X11 server 18 via path "C". The X11 server 18 process the commands received from the AUT and the sends screen update commands to the terminal 10 via path "D", where the terminal then executes the screen update commands, as well as passing the necessary events and screen commands to the GUI Tester 22. It is noted that in addition to the generation of the screen update commands by the X11 server, the X11 server may also generate other events in response to the commands received from the application. These events may then be sent back to the AUT via "B" which may then cause the AUT to issue additional events back to the X11 server.

By way of example, assume that an event played back from the test script is designed to cause a menu to be displayed. Based on an event generated by the GUI Tester, a command is sent from the AUT to the X11 server to display a menu window. The X11 server will display such a window, but it will be empty (containing no text). The X11 server will then generate an event telling the AUT that the requested window is now visible on the screen and the AUT can then send the necessary commands to draw the text into the menu.

One problem with the above approach to testing GUI software is that the same AUT may respond to the same input event in different ways depending on the timing of the event. The AUT may discard events during processing of prior events or during other processing unrelated to direct user input. During normal, user-driven operation, the events are processed correctly due to the speed at which a human is capable of generating the events. However, due to the delays in transmitting the input events, and differences in processing speed, the GUI tester can not guarantee that recorded events can be delivered at the appropriate time using the above approach.

Another problem with the above approach is that during operation of the hardware and software there may be significant time delays at each point in the data path. This is especially true in the case of network based display architectures, such as the X Window System, where clients and servers may be connected by slow speed, unpredictable communications links. These delays may occur at a number of different points in the processing path.

By way of example, on each of the labeled communication paths (A, B, C, D, X, Z) there are command queues which may introduce delay. This means that there may be many commands waiting to be processed which will delay processing of the last event generated by the GUI tester. There may also be significant processing delays in the X11 server itself, the AUT, and even the terminal. Therefore, before reading any information from the screen in order to make testing comparisons, the GUI Tester must be certain that all the commands from all of the buffers have been processed.

Since the time required to process events depends upon machine performance, machine load, and network load, the time it takes before a screen is considered stable may vary greatly from one test run to the next. This means that if the GUI Tester is using a time based method for synchronization, the time that is waited before a screen read is performed must be long enough to account for the worst case delay in order for the synchronization to be reliable.

As noted above, since the actual delay depends on many factors including network connections, using a worst case delay parameter may require waiting several minutes or even hours before being certain that a screen could be safely read. This is clearly not acceptable to any testing organization. On the other hand, if the chosen delay parameter time is too short, the test will generate false failures which in turn will waste time of people monitoring the tests. Therefore, the instant invention addresses these limitations resulting in an improved testing methodology and architecture which minimizes the delay factor while guaranteeing that a display screen is in a stable state, capable of being read for comparison purposes.

Figure 3:
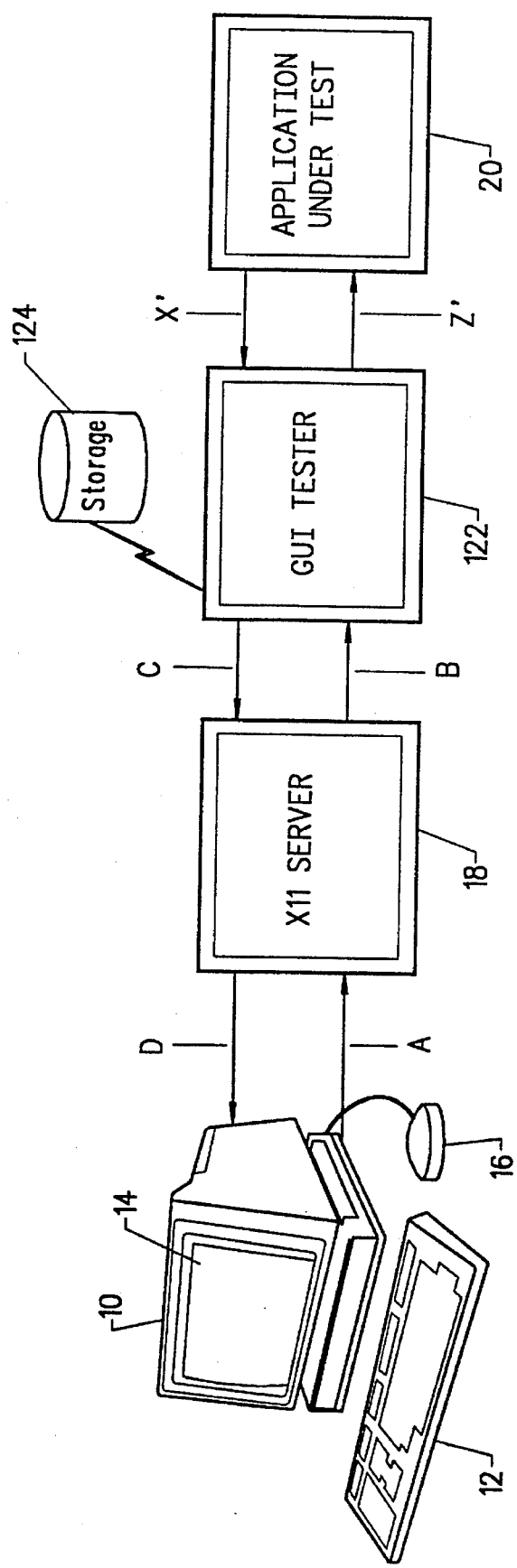
FIG. 3 is an illustration of a computer configuration for testing an application under test in accordance with the instant invention.

Referring, then, to FIG. 3, an illustration of a GUI tester system architecture configured in accordance with the teachings of the invention is shown. Elements of such an architecture, which are non-essential to the present invention, are disclosed in co-pending application Ser. No. 08/273,302, previously filed and commonly owned, and are herewith incorporated by reference. As noted above, prior to transmitting an input event to the AUT, the AUT must be in a state to process events in a predictable manner. With the approach taken in the prior art, there is no available mechanism for querying the AUT to determine if it is ready to process input events.

In addition, before performing a comparison test it is important to synchronize the output of the AUT with the X11 server and the terminal in order to make sure that the system is in a known state prior to Test. Even though the AUT can technically synchronize itself with the X11 server and the terminal, there is no mechanism in the X11 server (or in the X-Windows standard) for requesting the AUT to do this. This means that with the configuration shown in FIG. 2, the GUI Tester has no method available to support synchronization other than by waiting a predetermined amount of time. Since X servers are traditionally supplied by terminal vendors, modifying the X server itself is not a feasible solution. It is also not a desirable solution since, under ideal conditions the GUI Test architecture will match the end-user's architecture exactly in order to provide the highest level of confidence that a GUI Test will simulate real world operating conditions. When the X server is modified to accommodate test procedures it no longer represents with the same exactness the X servers found in the field.

Therefore, returning to FIG. 3, in order to guarantee synchronization in accordance with the invention, the GUI Tester 122 of the invention performs several steps. The first step in overcoming the problems discussed above is to modify the system configuration to more tightly integrate the GUI tester 122 into the X11 server/AUT communications link. As illustrated, this is done by interposing the GUI tester 122 between the X11 Server 18 and the AUT 20, with the result that all communications between the AUT and the X11 server must pass through the GUI Tester.

Since, under the invention, the GUI tester 122 communicates directly with the AUT, it can request the AUT to notify the GUI tester when it is in the correct state for processing input. In addition, the AUT can notify the GUI tester when all output requests have been transmitted to the X11 server 18 and displayed on terminal 10. This is accomplished by sending a new event, a specialized SYNCHRONIZATION event to the AUT. This SYNCHRONIZATION event is an extension to the X protocol and is implemented with a modified X library which, during testing, is linked with the AUT. However, while the X library is modified to include the SYNCHRONIZATION event, this event is activated only by the GUI tester and does not interact with the normal running of an AUT which is not under test, eliminating the need to relink the AUT to a standard X library prior to its use.

In operation, this specialized SYNCHRONIZATION event contains information used by the AUT to determine if this SYNCHRONIZATION request is being made for the purpose of providing input events to the AUT, or for the purpose of reading the terminal screen in accordance with conducting a test. On receiving the request, the AUT synchronizes with the X11 server and the terminal, and then returns a reply back to the GUI Tester that it is OK for the GUI Tester to reliably read the screen for comparison purposes.

Figure 4:
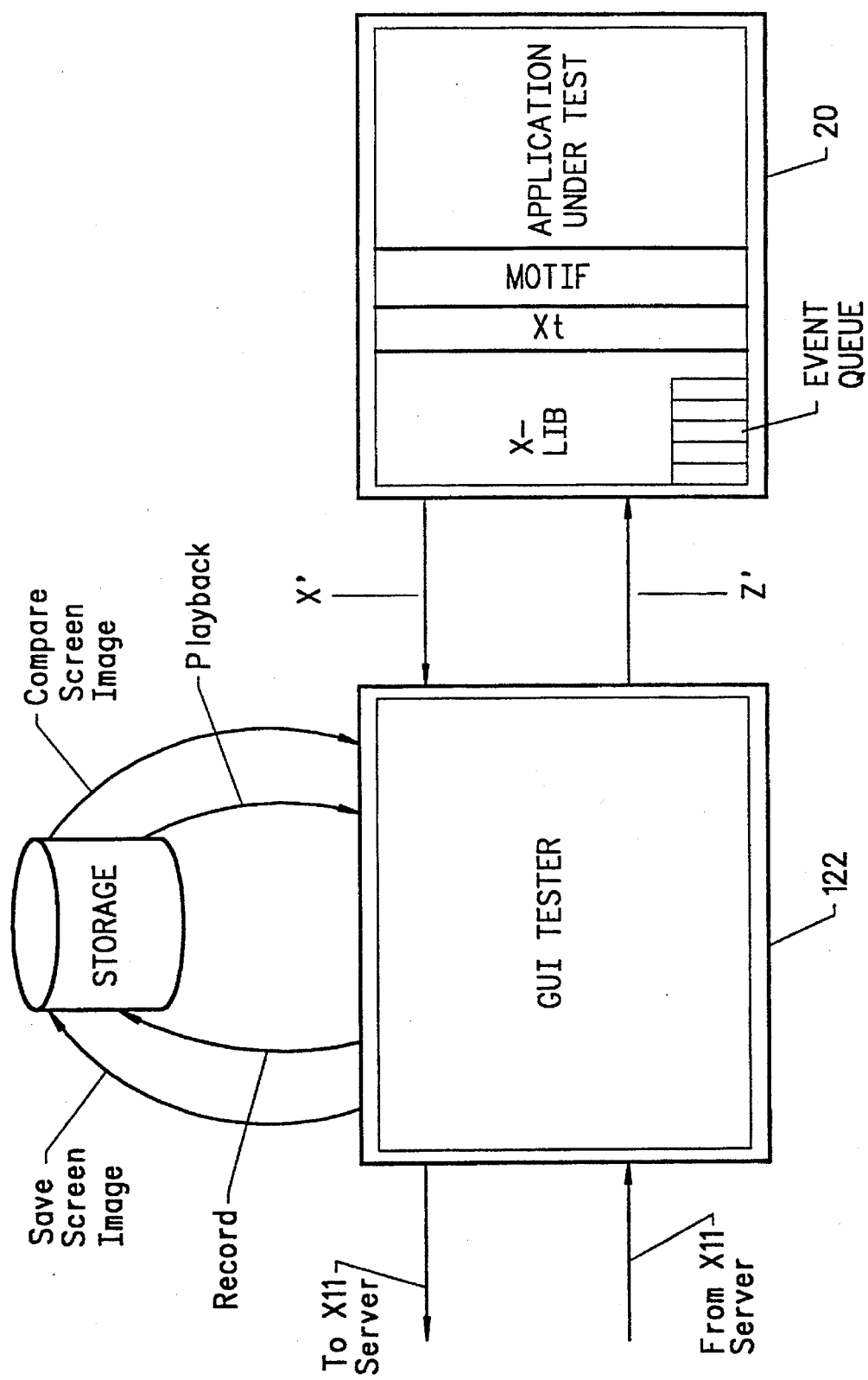
FIG. 4 is an illustration in greater detail of the GUI Tester and application under test illustrated in FIG. 3.

Referring to FIG. 4, the synchronization mechanism used by the application is illustrated in more detail. As can be seen, the GUI Tester 122 is associated with a storage device 124. As described above, keyboard and mouse events are recorded to storage device 124 as are saved screen images needed for comparison testing purposes. Then, once underway, the storage device 124 may be called upon to provide the playback of keyboard and mouse events from the test script to the GUI Tester 122, and may also provide the previously stored screen images for comparison purposes. As also seen in FIG. 4, the AUT 20 actually communicates with the GUI Tester through some additional layers of communications protocol. In particular, communications take place through an X-Library function which communicates with a Motif or OPEN LOOK or other Graphic User Interface, which in turn sits on top of the AUT. In addition, as shown in FIG. 4 and discussed above, the AUT employs an event queue where events are stacked until the AUT can process them.

During the replay of the events, the GUI tester must ensure that the AUT is in the correct state to process the events. This is accomplished using the SYNCHRONIZATION request discussed above. In this case, the SYNCHRONIZATION request includes the information required for the AUT to determine that the synchronization is for the purpose of providing input. In this case the AUT will complete processing of all other input events, as well as any unrelated processing, prior to notifying the GUI tester to proceed with the event transmission. Then, just prior to the AUT transitioning to an idle state, or blocking, while waiting for additional input events, the notification that synchronization is complete is sent to the GUI tester.

In addition to the synchronization process discussed above, the GUI tester must also ensure synchronization with the AUT prior to executing any screen comparisons. As noted earlier, while the X11 protocol supports a synchronize command, this command by itself is insufficient for the purpose of synchronizing an AUT in a GUI Test environment for a number of reasons. The first reason is that the synchronization request as defined by the X11 protocol only synchronizes the application with the X11 server, and not with the terminal itself, so it will still not be clear as to when it is 'safe' for the GUI Tester to read the screen. The second reason is that, as noted above, at any point in time requests or events which are awaiting processing by the X11 server may themselves generate additional events. Therefore, in order for the synchronization process to be completely stable, these subsequent events must be processed and the AUT re-synchronized with the X server and the terminal.

To do this under the invention, the AUT first processes all input events and any other unrelated processing in the same manner as done for input synchronization. The AUT then synchronizes itself with the X11 server 18 and the terminal 10 using the X11 protocol synchronize command. Then, the AUT processes any new events generated by the X11 server, checks and processes any new unrelated processing, synchronizes with the X11 server and the terminal, and then returns a reply back to the GUI Tester that the system is now in a stable state for the GUI Tester to reliably read the screen for comparison purposes.

As indicated this method of synchronization is extremely useful in testing GUI application programs and it advantageous over the prior art in that it can guarantee synchronization between an AUT's screen writes and a GUI Tester's screen reads. This method of synchronization also overcomes false 'error' disadvantage of prior art and dramatically improves GUI testing speed as the GUI Tester can perform a required screen read necessary for comparison testing purposes at the first possible instant, resulting in no unnecessary wait time.

However, while the above described procedure is quite beneficial in ensuring synchronization, it doesn't address other problems encountered in GUI testing, such as testing more than one program at a time or using a test station for running programs not under test while at the same time that GUI testing is proceeding. As discussed, it is desirable to check the screen contents at certain locations during the execution of a test to ensure that the application is drawing the screen correctly. This is normally done by reading the screen directly. The problem encountered by existing GUI testers, however, is that the window being captured must not be obscured by any other windows (or objects), or the screen capture will read the contents incorrectly. To avoid this problem, existing testers require that the windows for the AUT be on top of any other windows. This means that a workstation which is being used to run a test on an AUT cannot be used for other work since the user would not be able to switch to other applications. This also means that multiple tests can not be run simultaneously since there may a conflict for which window is on top.

Figure 5:
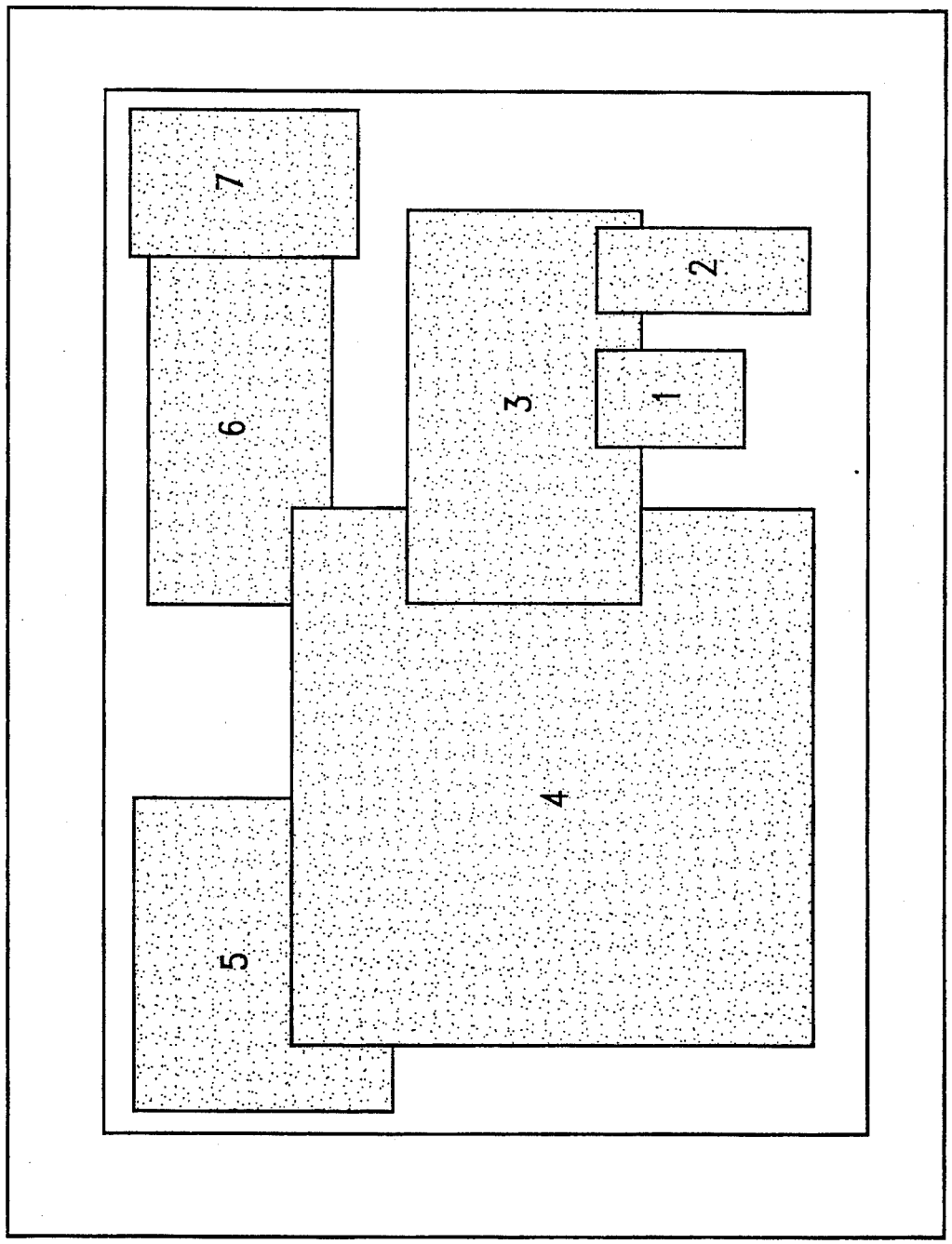
FIG. 5 is an illustration of a sample windowed screen as may be encountered in connection with the instant invention.

Referring to FIG. 5, a sample display illustrating multiple windows is shown. As illustrated seven different windows are open on the screen of FIG. 5. However, due to the nature of the windowing environment, all but windows 1 and 2 are at least partially blocked or obscured. This violates the requirement that the AUT be the top most window if the AUT is running in any window except 1 or 2. In addition, since multiple windows are open, multiple applications may be active with the result that while windows 1 and 2 are currently on 'top', a user might at any point use a mouse to choose another window, such as window 3, which would result in the partial obfuscation of windows 1 and 2.

Figure 6:
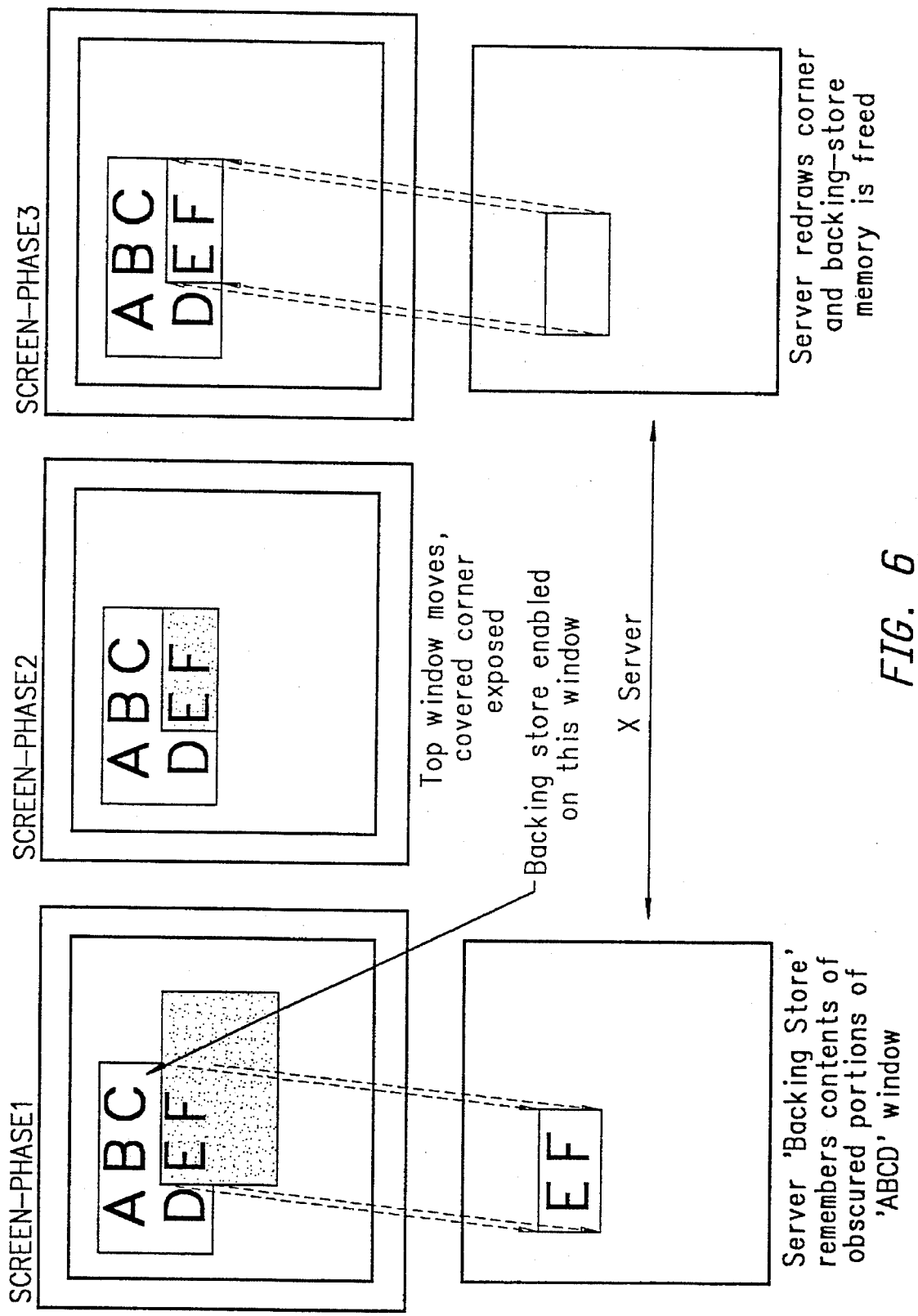
FIG. 6 is an illustration of the operation of a backing store as practiced in accordance with the instant invention.

Using the teachings of the invention this problem may be solved by using two approaches, the choice of which will depend on the capabilities of the window system being used. The first approach uses a 'backing store' which duplicates the contents of a window into off screen storage. An example of such a backing store is shown in FIG. 6. As illustrated, when a backing store is enabled all (or a portion) of a window which is at least partially obscured is copied into a backing store memory. Since this memory copy of the window is guaranteed to be identical to the on screen window, it can be read in place of the actual screen contents in order to test for proper drawing. By using a backing store the memory resident copy of any stored window is kept up to date even if the on screen window is obscured by other windows. Then, by reading the copy, the GUI tester will arrive at a valid test result which would otherwise have been obtained if the window for the AUT was the top window on the screen.

Unfortunately, not all windowing systems are designed in exactly the same way. Some windowing systems do not support the memory resident copy of windows (such as a backing store) at all while other systems may discard the contents of a backing store if system memory gets low. In these cases if the invention is to function and testing of an AUT to be carried out successfully, then it becomes necessary to force the window displaying the AUT on top of all other window, making it the active window and invoking the synchronization and flushing mechanism described above and disclosed in the above referenced co-pending application. By making it a priority for the GUI tester to automatically place the correct window on top of all others, and allowing the program under test to take priority over any other program running at the same time, it may be ensured that an unobstructed view of the window under test will be available for comparison purposes by the GUI tester. In addition, by utilizing the SYNCHRONIZATION mechanism described above, it can also be ensured that the screen contents are accurate prior to screen capture.

However, since the invention allows for the testing of multiple AUT at the same time, it is recognized that there may still be conflicts when (1) no backing store is available and (2) there are multiple copies of the tester running, since more than one tester may be trying to place "it's" windows on top of the others at the same time. This problem is solved by using a locking mechanism for controlling the contents of the screen. In accordance with this locking mechanism element of the invention, during screen capture the GUI tester will take control of the screen, raise the window to be captured, capture that window, and then release the screen control lock. This sequence prevents a window from one test or from another program running which is not under test from obscuring the windows being captured for comparison purposes.

Finally, as noted above, some systems, while employing a backing store, still discard the off screen copy of such a store at certain times in order to save memory or other system resources. In these cases the GUI tester must know that the off screen contents have been discarded so that it can switch to the second mechanism described above where the AUT is forced to the topmost window and the screen is locked during capture.

A problem that has been noted is that some of these systems will discard the memory but not explicitly notify the application. In such a case the application is only notified that a portion of the screen needs to be repainted. Unfortunately, screen repaint requests are not in themselves sufficient to determine if the off screen copy of a window has been discarded since there are other reasons that the application may be requested to repaint a portion of a window. Therefore in order to arrive at a known state of the backing store memory in these cases the invention forces a known portion of the on screen window contents to be damaged.

In one preferred embodiment, the method to intentionally damage screen contents may be realized by momentarily placing and removing a small window overlaid on top of the window containing the screen image to be captured. This window should be small (e.g., one pixel by one pixel in size) to avoid providing a visual disturbance to the person operating the tester and to avoid inadvertently damaging any adjacent screen areas containing screen displays which are not, at that moment, the subject of testing.

Then, by inducing such damage, if the off screen copy of the window has been maintained, the window system will repair the damage by using information from the off screen copy without notifying the application. (This can be seen in Phase 3 of FIG. 6). If, however, the off screen copy has already been discarded (and is therefore no longer available for comparison purposes), the application will then be notified to repaint the screen. Since the area that we damaged is easily identified, and is selected to be small enough not to correspond exactly to a valid repaint request, by monitoring the server to application data stream for a repaint request for the known region, if seen at the appropriate time, the GUI tester can determine when the off screen copy of a window has been discarded.

Accordingly, it will thus be seen that the objects set forth above, among those made apparent from the preceding description are efficiently attained and, since certain changes may be made in the above constructions without departing from the spirit and scope of the invention, it is intended that all of the matter contained in the above description or shown in the accompanying drawings, shall be interpreted as illustrative, and not as limiting.

It will also be understood that the following claims are intended to cover all of the generic and specific features of the invention, herein described, and all statements of the scope of the invention which, as a matter of language, might be said to fall there between.

What is claimed is:

1. A method for simultaneously testing multiple graphic user interface programs comprising the steps of:

establishing criteria indicative of a successful test for each program under test;

inducing operation of each program under test to generate a resulting display window;

synchronizing the induced operation of each of said programs under test so that each resulting display window generated by each of said programs under test is in a determinable state;

comparing each of said display windows to said associated established criteria indicative of a successful test of each program under test;

generating a signal for each program under test indicative of a successful test when said display window generated in accordance with the operation of said program under test matches the established criteria indicative of a successful test; and further comprising the steps of:

intentionally damaging a portion of the display window for the program under test so that if a non-displayed representation of the display window for the program under test is available it will be used for comparison purposes and if no non-displayed representation of the display window for the program under test is available the program will redraw the display window prior to performing the steps of comparing the display window to the established test criteria.

2. A method for simultaneously testing multiple graphic user interface programs comprising the steps of:

establishing criteria indicative of a successful test for each program under test;

inducing operation of each program under test to generate a resulting display window drawn on a display screen;

synchronizing the induced operation of each of said programs under test so that each resulting display window generated by each of said programs under test is in a determinable state;

comparing each of said display windows to said associated established criteria indicative of a successful test of each program under test;

generating a signal for each program under test indicative of a successful test when said display window generated in accordance with the operation of said program under test matches the established criteria indicative of a successful test; and further comprising the step, performed prior to performing the step of comparing each of said display windows to said associated established criteria, of making each display window associated with the set of established criteria to be compared in the comparison window the active window;

wherein the step of making the window associated with the program under test the active window further comprises the steps of locking the display screen from control by either the user or the program under test, said locking step further comprising the steps of:

locking the display screen state;

raising the window to be captured for comparison purposes to the top;

capturing the display window to be tested; and releasing the locking step so that either the user or the program under test may again control the display screen.

3. An improved graphic user interface tester, comprising:

storage means for storing a program to be tested;

computer system means, communicating with said storage means, for executing the instructions comprising a program to be tested which is stored on said storage means;

said computer means further comprising input means for permitting a user to input information into said computer system means;

said computer means further comprising output means for visually displaying the results of the execution of instructions comprising the program to be tested by said computer system means;

comparison means for comparing the visible display resulting from the executing of instructions comprising the program to be tested with a predetermined display indicative of a successful test; and signal means for signaling, the result obtained by said comparison means;

wherein said output means further comprises a non-visible display means which may store the results of the execution of instructions comprising the program to be tested by said computer system means; and wherein said comparison means compares the non-visible display resulting from the executing of instructions comprising the program to be tested with a predetermined display indicative of a successful test;

wherein said computer system may execute and display the results of at least two graphic user programs being tested simultaneously, and further comprising:

display priority means coupled to said comparison means for controlling which of the displayed at least two results should be tested by said comparison means; wherein said display priority means further comprises:

display locking means for locking said output means from control by either a user or said computer means; and wherein said comparison means further comprises:

display capture means for raising the display of the program under test to be the active display and then storing the last raised display image;

whereby the display is prevented from being changed while the comparison means is operative.

4. A method for testing one or more graphic user interface programs while simultaneously running a program not under test comprising the steps of:

inducing operation of at least one program not under test;

establishing criteria indicative of a successful test for each program under test;

inducing operation of each program under test to generate a resulting display window;

synchronizing the induced operation of each said program under test so that each resulting display window generated by each said program under test is in a determinable state;

comparing each of said display windows to said associated established criteria indicative of a successful test of each program under test; and generating a signal for each program under test indicative of a successful test when said display window generated in accordance with the operation of said program under test matches the established criteria indicative of a successful test;

further comprising the step of:

intentionally damaging a portion of the display window for the program under test so that if a non-displayed representation of the display window for the program under test is available it will be used for comparison purposes and if no non-displayed representation of the display window for the program under test is available the program will redraw the display window prior to performing the steps of comparing the display window to the established test criteria.

5. A method for testing one or more graphic user interface programs while simultaneously running a program not under test, comprising the steps of:

inducing operation of at least one program not under test;

establishing criteria indicative of a successful test for each program under test;

inducing operation of each program under test to generate a resulting display window drawn on a display screen;

synchronizing the induced operation of each said program under test so that each resulting display window generated by each said program under test is in a determinable state;

comparing each of said display windows to said associated established criteria indicative of a successful test of each program under test; and generating a signal for each program under test indicative of a successful test when said display window generated in accordance with the operation of said program under test matches the established criteria indicative of a successful test;

further comprising the step, performed prior to performing the step of comparing each of said display windows to said associated established criteria, of making each display window associated with the set of established criteria to be compared in the comparison window the active window;

wherein the step of making the window associated with the program under test the active window further comprises the steps of locking the display screen from control by either the user or the program under test, said locking step further comprising the steps of:

locking the display screen state;

raising the window to be captured for comparison purposes to the top;

capturing the display window to be tested; and releasing the locking step so that either the user or the program under test may again control the display screen.

* * * * *